(12) United States Patent
Gisby et al.

(10) Patent No.: US 10,539,475 B2
(45) Date of Patent: Jan. 21, 2020

(54) STRETCH SENSOR WITH AN IMPROVED FLEXIBLE INTERCONNECT

(71) Applicant: STRETCHSENSE LIMITED, Penrose (NZ)

(72) Inventors: Todd Alan Gisby, Auckland (NZ); Andrew Thomas Wong, Auckland (NZ); Llewellyn Adair Sims Johns, Auckland (NZ)

(73) Assignee: SENSOR HOLDINGS LIMITED, Penrose, Auckland (NZ)

( * ) Notice: Subject to any disclaimer, the term of this patent is extended or adjusted under 35 U.S.C. 154(b) by 0 days.

(21) Appl. No.: 16/461,695

(22) PCT Filed: Nov. 16, 2017

(86) PCT No.: PCT/NZ2017/050148
§ 371 (c)(1),
(2) Date: May 16, 2019

(87) PCT Pub. No.: WO2018/093275
PCT Pub. Date: May 24, 2018

(65) Prior Publication Data
US 2019/0339141 A1 Nov. 7, 2019

(30) Foreign Application Priority Data
Nov. 17, 2016 (AU) ................................ 2016904703

(51) Int. Cl.
*G01L 1/00* (2006.01)
*G01L 1/14* (2006.01)
*G01B 7/16* (2006.01)

(52) U.S. Cl.
CPC .................. *G01L 1/14* (2013.01); *G01B 7/22* (2013.01); *G01L 1/146* (2013.01)

(58) Field of Classification Search
CPC .............. G01L 1/14; G01L 1/146; G01B 7/22
USPC .......................................................... 73/780
See application file for complete search history.

(56) References Cited

U.S. PATENT DOCUMENTS

| 3,634,929 | A | * | 1/1972 | Yoshida | ................. G11C 17/16 |
| | | | | | 438/131 |
| 5,165,281 | A | * | 11/1992 | Bell | ...................... G01L 9/0075 |
| | | | | | 361/283.4 |
| 6,033,370 | A | | 3/2000 | Reinbold et al. | |
| 9,871,160 | B2 | * | 1/2018 | Tian | .................. H01L 27/14603 |
| 2007/0186667 | A1 | | 8/2007 | DeAngelis et al. | |

(Continued)

FOREIGN PATENT DOCUMENTS

| EP | 2461146 A1 | 6/2012 |
| WO | 2007/094993 A1 | 8/2007 |
| WO | 2015/133417 A1 | 9/2018 |

*Primary Examiner* — Max H Noori
(74) *Attorney, Agent, or Firm* — MH2 Technology Law Group LLP

(57) ABSTRACT

In one embodiment the invention provides an interconnection component operable to interconnect a stretchable sensing component and cable for a sensing circuit. The interconnection component has a flexible circuit board comprising conductive regions to electrically connect to conductive layers of a sensor component overlaying the circuit. The flexible circuit board of one embodiment comprises engagement features to allow the sensor cast over the component to engage the flexible circuit board.

16 Claims, 8 Drawing Sheets

(56) References Cited

U.S. PATENT DOCUMENTS

| | | | |
|---|---|---|---|
| 2007/0222021 A1* | 9/2007 | Yao | H01L 23/481 257/499 |
| 2011/0109583 A1* | 5/2011 | Lee | G06F 3/044 345/174 |
| 2016/0327441 A1 | 11/2016 | Iwase et al. | |
| 2017/0074636 A1 | 3/2017 | Otaka et al. | |

* cited by examiner

STRETCH SENSOR WITH AN IMPROVED FLEXIBLE INTERCONNECT

CROSS REFERENCE TO RELATED APPLICATIONS

This application is a U.S. National Stage entry of PCT/NZ2017/050148, filed Nov. 16, 2017, which claims priority to AU Application No. 2016904703, filed Nov. 17, 2016, the contents of all of which are hereby incorporated by reference in their entirety.

FIELD OF THE INVENTION

This invention relates to improvements in respect of soft electronic components. In particular, this invention relates to improvements in respect of sensors which stretch in use to provide a varying electrical characteristic. Further in particular, this invention relates to interconnection of electrodes of stretchable sensor components to electronic circuits.

BACKGROUND OF THE INVENTION

Stretch sensors have electrical characteristics which have carefully determined variations in an electrical characteristic to allow the degree of stretch of a sensor to be sensed or measured by a sensing circuit. To be commercially valuable, an initial value of an electrical characteristic needs to be in a suitable range for economically available sensing circuits and the variation in the electrical characteristic with stretch needs to be within a suitable range again for economically available sensing circuits.

One type of stretch sensor has a capacitance and resistance formed by stretchable electrodes separated by stretchable dielectrics separating the stretchable electrodes.

The degree of stretch in the sensor can be measured by sensing or measuring the capacitance and/or resistance in the sensor as it is stretched.

This measured degree of stretch can be used to instrument deformation or movement of a body, such as a human or animal body or limb, or structure or other object by mechanically coupling the sensor or to the body and measuring the degree of stretch by capacitance and/or resistance.

A challenge in the use of stretch sensors is to instrument deformation of a body is in interconnecting the part of the sensor which stretches with a sensing circuit which senses or measures the capacitance and/or resistance.

A problem in meeting this challenge is interconnecting electrodes in a sensor with terminals for sensing electronics or cables for a circuit.

Specific problems arise when electromagnetic noise occurs in the region of a sensor.

Further problems arise when the stretchable sensor stretched in use away from rigid terminals.

In some specific capacitive stretch sensors it would therefore be of advantage to have a stretch sensor which could address any or all of the above problems, or at least provide the public with an alternative choice.

DISCLOSURE OF THE INVENTION

In one aspect the invention provides a sensor operable to provide a capacitance which varies with stretch, the sensor comprising:

a sensor component comprising first and second electrode films separated by a dielectric film to provide a capacitance, wherein the sensor component is operable to stretch to change an area of overlap of the electrode films and/or change the separation of the electrode films to change the capacitance, wherein changes in capacitance are measurable to allow stretch in the sensor component to be measured;

first and second terminals operable to connect to a circuit to allow measurement of the change in capacitance;

an interconnection component comprising a first conductive region to which the first electrode film is bonded to electrically connect the first electrode film to the first terminal and comprising a second conductive region onto which the second conductive film is bonded to connect the second electrode film to the second terminal, wherein the second electrode film overlays the first electrode film on the interconnection component to shield the first electrode film.

The second electrode films may also overlay the second conductive region.

This may provide that the first electrode film is shielded by the other second electrode.

The sensor may comprise a third electrode film also overlaid by the second electrode film.

The third electrode film may be overlaid by the first electrode film also. This may provide that the first electrode film is shielded by the second and third electrode films.

The sensor component may be arranged substantially as a sheet and the conductive regions may be arranged parallel to respective bonded electrode films.

The interconnection component may comprise a sheet of flexible material on which the conductive regions are provided.

The interconnection component may comprise one or more stretch control features which influence fields of stretch occurring in the sensor component in a stretch control section of the sensor.

A stretch control feature(s) may comprise a taper formed in the interconnection component.

A stretch control feature(s) may comprise one or more apertures formed in the interconnection component.

A stretch control feature(s) may be arranged to graduate strain occurring in the strain control section of the sensor component as the sensor is stretched.

A strain control feature(s) may provide an interface between the interconnection component and the sensor component which has a range of angles to a direction of stretch.

A stretch control features may comprise material moulded over a juncture between the interconnection component and the sensor component.

The interconnection component may comprise a stretch control component operable to stretch under stress imparted by the sensor component.

The interconnection component may comprise a stretch control component operable to flex under stress imparted by the sensor component.

The terminals may be rigid.

The interconnection component may be flexible but non-stretchable.

The sensor component may be stretchable.

In another aspect the invention provides a sensor with an interconnect between a deformable sensor and a sensing circuit, wherein the sensor is operable to change an electrical characteristic with deformation of the sensor, the sensor comprising:

an interconnection component having first and second conductive interface regions formed of conducting material;

a first conductive layer of stretchable conductive material for the sensor the first conductive layer comprising a first sensor region operable to stretch and comprising a first interface region overlaying a first interface conductive region of the flexible component to connect the sensor region of the conductive layer of stretchable material to the flexible conductive component;

a second conductive layer of stretchable material comprising a second sensor region overlaying the first sensor region and operable to stretch and comprising a second interface region overlaying a second conductive interface region of the flexible component;

a first dielectric layer of stretchable dielectric material bonded to the first conductive layer the first dielectric layer comprising a sensor region operable to provide electrical insulation for the first conductive layer of stretchable material from the second conductive layer of stretchable material and an interface region which overlays the first conductive interface region of the conductive component to provide insulation between the second conductive layer of stretchable material and the first conductive interface of the conductive component.

The sensor may be operable to be mechanically coupled to a body which deforms, operable to stretch as the body is deformed to change the electrical characteristic to instrument deformation of the body.

The sensor may comprise a third conductive layer of stretchable material overlaying a third interface region overlaying a third conductive interface region of the flexible component.

The second conductive layer may overlay a portion of the first conductive layer and the third conductive layer overlays the entire second conductive layer so that the second conductive layer provides a signal conductor for the sensor which is shielded by the first and third conductive layers wherein a capacitance between the signal conductor and the shielding layers varies as the layers are stretched.

In another aspect the invention provides a sensor operable to provide a capacitance which varies with stretch occurring in the sensor, the sensor comprising:

a sensor component having electrode films separated by dielectric films to provide a capacitance, wherein the sensor component is operable to stretch to change an area of overlap between separated electrode films and/or change a separation of the electrode films to change capacitance, and wherein the capacitance is measurable to allow stretch in the sensor component to be measured, the sensor comprising:

two or more terminals operable to connect to a circuit to allow measurement of the capacitance across two or more of the electrode films;

an interconnection component comprising conductive regions to which electrode films are bonded to electrically connect the electrode film the first terminal;

wherein the terminals are rigid, the interconnection component is flexible but non-stretchable and the sensor component is stretchable.

In another aspect the invention provides a sensor operable to provide a capacitance which varies with stretch occurring in the sensor, the sensor comprising:

a sensor component having electrode films separated by dielectric films to provide a capacitance, wherein the sensor component is operable to stretch to change an area of overlap between separated electrode films and/or change a separation of the electrode films to change capacitance, and wherein the capacitance is measurable to allow stretch in the sensor component to be measured, the sensor comprising:

two or more terminals operable to connect to a circuit to allow measurement of the capacitance across two or more of the electrode films;

an interconnection component comprising conductive regions to which electrode films are bonded to electrically connect the electrode film the first terminal, wherein the interconnection element has a strain control section operable to locate away from the conductive regions strain effects resulting from an interface between the interconnection element and the stretchable sensor component.

BRIEF DESCRIPTION OF THE DRAWINGS

Additional and further aspects of the invention will be apparent to the reader from the following description of embodiments, given by way of example only, with reference to the accompanying drawings in which.

Further aspects of the invention will become apparent from the following description of the invention which is given by way of example only of particular embodiments.

BEST MODES FOR CARRYING OUT THE INVENTION

Figure 1:
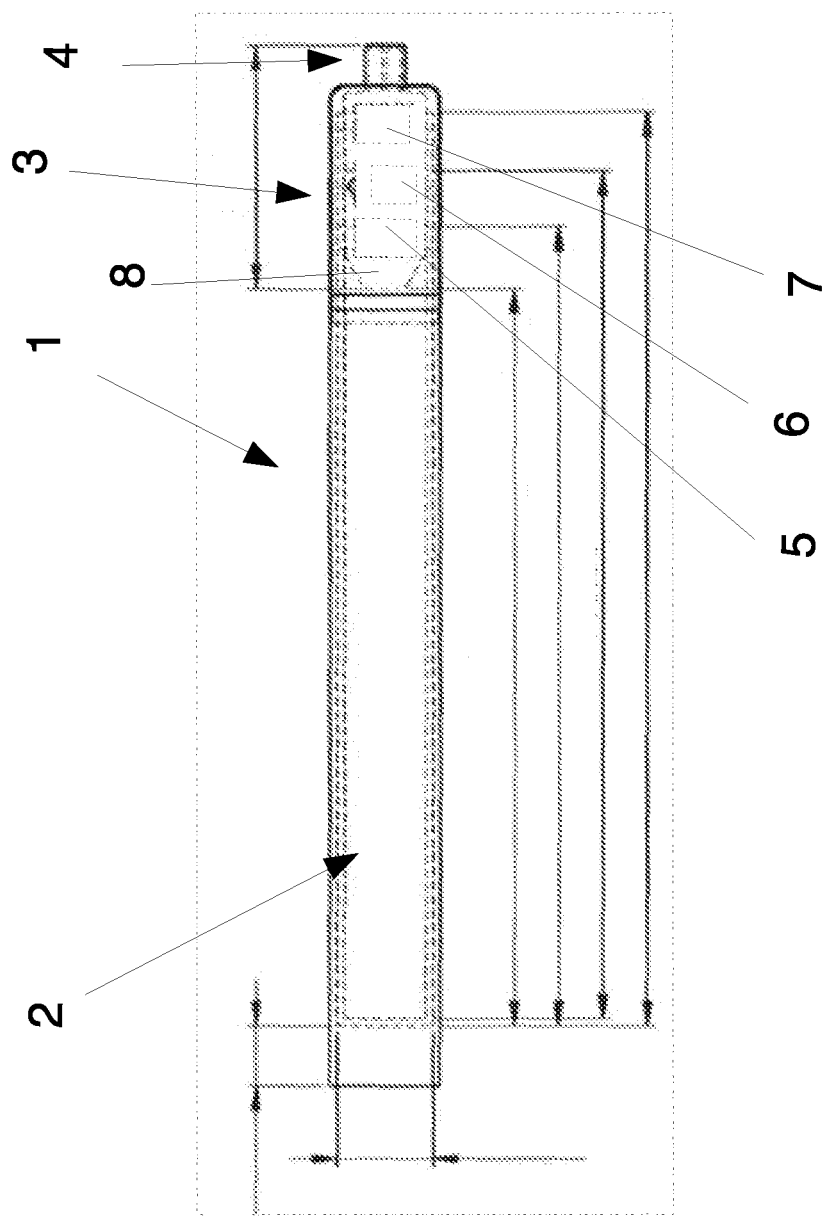
FIG. 1 gives a plan view of a stretch sensor according to a preferred embodiment of the present invention.

FIG. 1 shows a sensor 1 which is operable to provide an electrical characteristic which varies as a sensor component 2 is deformed. This allows the degree of deformation, such as strain or stretch experienced by the sensor component 2 to be sensed and/or measured. Measuring the degree of stretch allows instrumenting of deformation of a body or object, for example, to which the stretchable sensing component 2 is mechanically coupled.

In this particular embodiment the sensor component is a stretchable laminate with layers which act as electrodes of a capacitor and layers which act as dielectrics separating electrodes of a capacitor. The sensor component 2 has a capacitance which varies as the laminate is stretched.

In this particular embodiment the stretchable sensor component 2 is provided with an adhesive (not shown) which allows the component 2 to be heat-bonded to a garment, for example, to mechanically couple the sensor to a limb to allow instrumenting of a limb or other part of a human or animal body.

The sensor 1 shown in FIG. 1 has an interconnection component 3 to interconnect the stretchable sensor component 2 to a terminal 4 connection to a sensing circuit (not shown) which senses and/or measures the electrical characteristic of the stretchable sensing component 2 which varies with the degree of stretch. The reader will recognise that the terminal 4 provides an interface for a sensing circuit and that the interconnection component interconnects electrode layers of the sensor component to the terminal 4.

The interconnection component 3 shown in FIG. 1 has a first sensor interface 5 to interface with an electrode layer of the sensor component 2. The interface 5 is a region of conductive material formed on a substrate of material. In this example, the interface or conductive region 5 is formed of copper and the substrate is a polyamide tape.

The interconnection component 3 shown in FIG. 1 also has a second sensor interface 6, also formed of a region of conductive material formed on a substrate of material. The second interface, or conductive region, 6 of this particular embodiment is located relatively distal from a region where the sensor component 2 stretches in use compared to the first sensor interface 5.

The interconnection component 3 shown in FIG. 1 also has a third sensor interface, or conductive region, 7 which is located relatively more distal from the region in which the sensor component 2 stretches.

FIG. 1 shows a tapered region 8 of the interconnection component 3, tapering towards the main part of the sensor component 2. In this particular embodiment this taper serves various functions. The first function is that the interconnection component 3 has less material towards the end of the taper and therefore is more flexible towards the end of the taper. This graduates strain occurring in the sensing component 2 as it is stretched. The second function is a line of contact between the sense component 2 and the interconnection component 3 in the plane of the interconnection component 3 is increased. A third function is that the interface between the sensor component 2 and the interconnection component 3 in the plane of the interconnection component 3 has components which are at a range of angles to a direction of stretch in which the sensor component 2 is elongated to accommodate. The tapered section may be referred to as a strain control section, with the taper being strain control feature. A general function of the strain control section is that any strain effects that occur at a juncture or interface between the interconnection element and the sensor component will occur in the strain section. This will locate them away from the conductive regions 5, 6 and 7.

Figure 2:
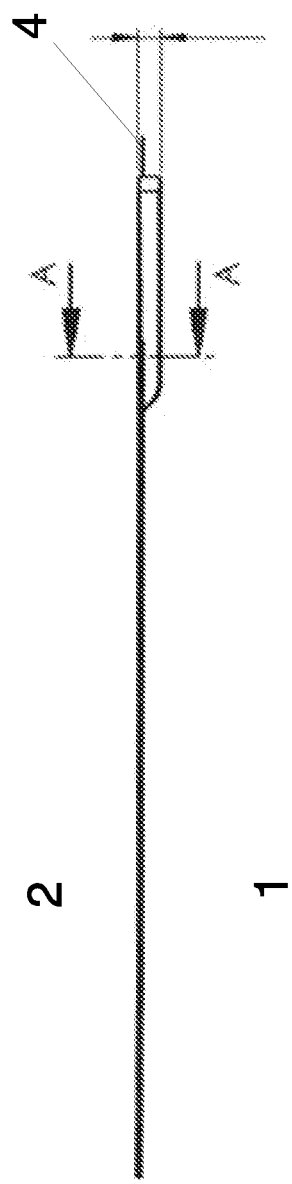
FIG. 2 gives a side view of the stretch sensor of the same embodiment as FIG. 1.

FIG. 2 shows a side view of the stretchable sensor 1. As visible in FIG. 2 the interconnection component 3 in this example is thicker than the stretchable sensor component 2 due to an over-mould 9 material which seals the interfaces 5, 6 and 7 against the ingress of water for example. This over-mould 9 allows the sensor 1 to be washable.

Figure 3:
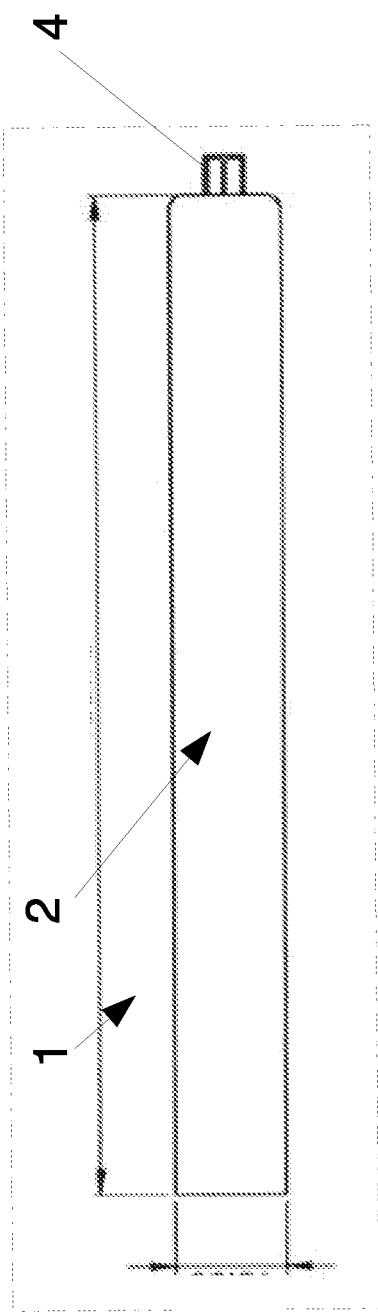
FIG. 3 gives a plan view of a stretch sensor according to the same embodiment as FIGS. 1 and 3 from the opposite side to FIG. 1.

FIG. 3 gives a view of the underside of the stretchable sensor 1.

Figure 4:
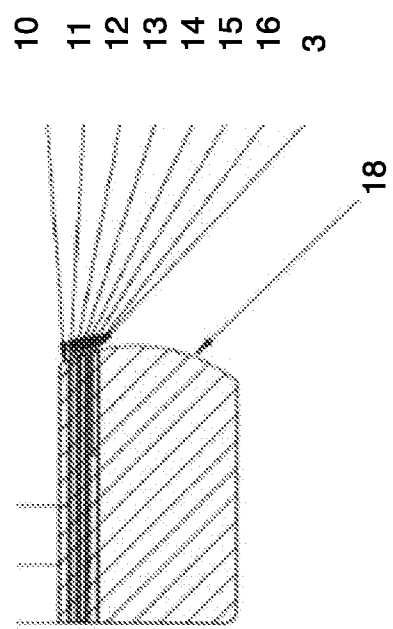
FIG. 4 gives cut-away side of an end view of a stretch sensor according to the same embodiment as FIGS. 1 to 4.

FIG. 4 shows a cross-section taken at section line A-A of FIG. 2. As shown in FIG. 4 at the interconnection component 3 layers of stretchable dielectric material 10, 12, 14 and 16 are arranged into sandwich layers of stretchable conductive material 11, 13, and 15. In this example the layer of stretchable conductive material 13 provides a signal electrode for the stretch sensor 1 and layers of stretchable conductive material 11 and 15 provide electrical earthing, and/or shielding. A capacitance formed between the conductive layer 13 and the conductive layers 11 and/or 15. As the reader will appreciate the capacitance changes as the stretch sensor component 2 is stretched. As the reader will be aware this change in capacitance occurs due to a change in the overlapping area of the electrodes 13 and electrodes 11 and 15 and also due to the electrodes becoming closer together by the elastic nature of the dielectric layers 12 and 14. Also shown in FIG. 4 the flexible component 3 has an over-mould material which encapsulates the component 3 which provides mechanical protection and seals the component 3 from water for example.

Figure 5:
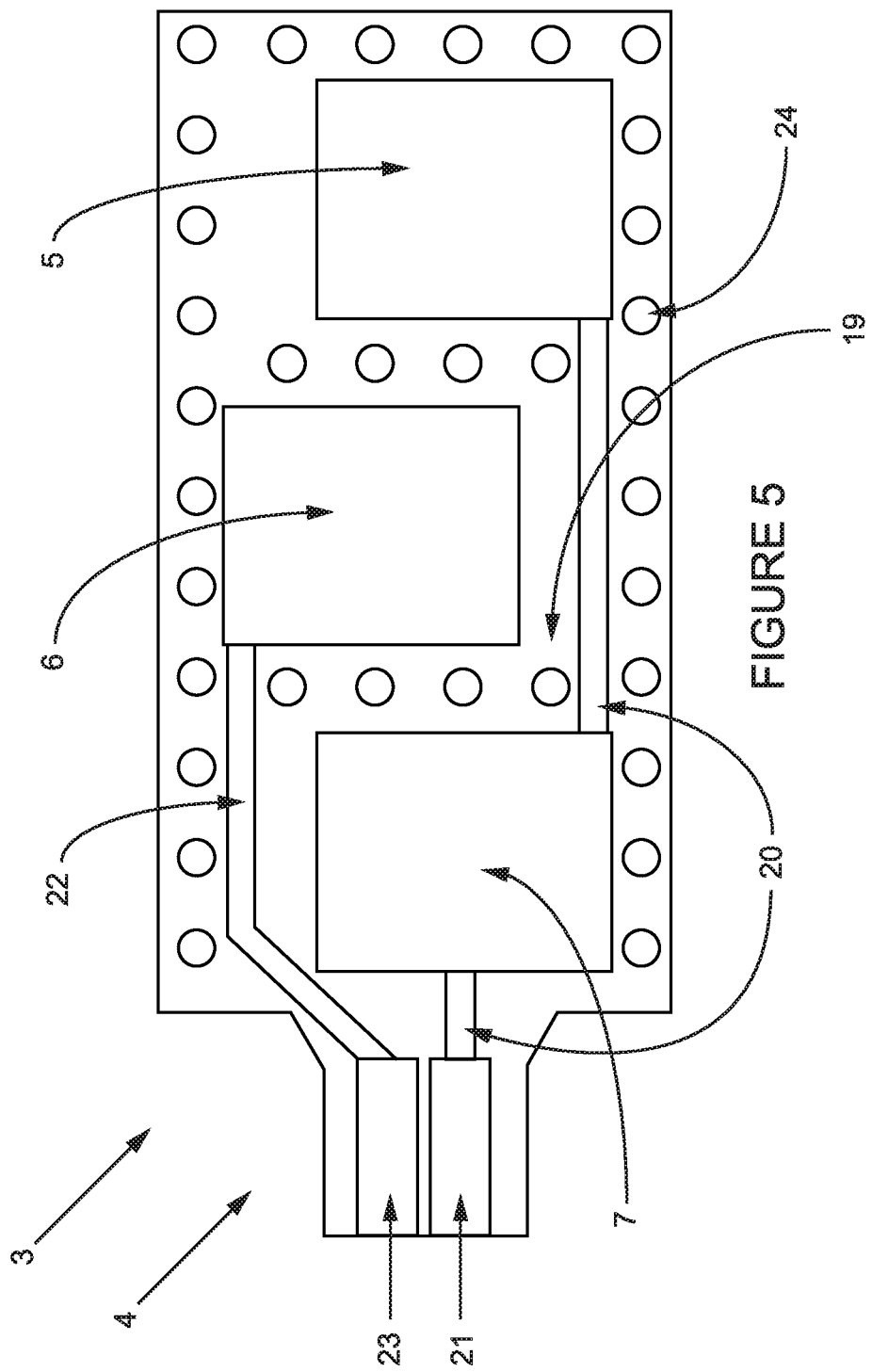
FIG. 5 gives cut-away side of a stretch sensor according to the same embodiment as FIGS. 1 to 5.

FIG. 5 shows the interconnection component 3 of the embodiment of FIGS. 1 to 4. FIG. 5 shows regions of conductive material providing interfaces 5, 6 and 7 formed on a thin sheet of flexible substrate material 19. On the opposite side of the substrate material 19 to the interfaces 5, 6 and 7 is formed a track 20 of conductive material which connects interfaces 5 and 7 to an earthing, or shielding, terminal 21. As shown, another track 22 of conductive material connects the interface region 6 to a signal terminal 23.

Also shown in FIG. 5 is a set of apertures 24 formed in the substrate material 19 of the interconnection component 3. The apertures 24 provide engagement features allowing elastic material, such as a layer of dielectric elastic material 17 to fill the apertures to engage the substrate material 19 to mechanically engage the interconnection component 3.

As shown in FIG. 5 the interfaces 5 and 7 are offset laterally with respect to interface 6. This serves the purpose of allowing separation of the track 20 from the track 22. It also serves the purpose of providing separation between electrode liquid use form conductive layers of the sensor component 2 some lateral separation for liquid used to form electrodes of the sensor component 2, prior to setting or curing, from an interface region to which it will not be interfaced or connected.

In the example shown in FIG. 5, the apertures 23 are arranged around the periphery of the substrate material 19 of the interconnection component 3 and in rows transverse to the axis of the elongate interconnection component 3.

Figure 6:
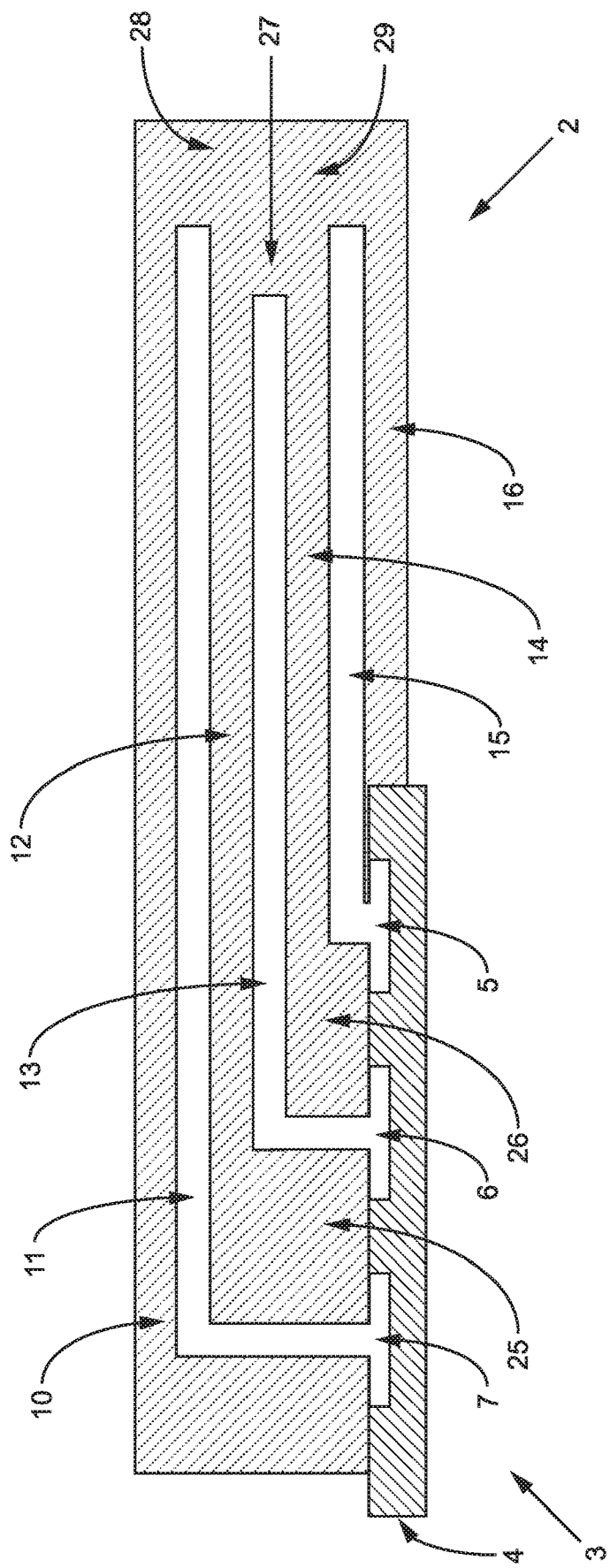
FIG. 6 shows an interconnection component according to the same embodiment as FIGS. 1 to 5.

FIG. 6 gives a cutaway side elevation of a sensor 1. As is visible in this view, the dielectric layer 14 is formed to cover and extend beyond the conductive layer 15 into a region 26.

FIG. 6 also shows a shielding-electrode layer 15 interfacing with the interface 5 provided on the component 3. The shielding-electrode layer 15 overlays the conductive region 5.

Also, as is shown in FIG. 6, the signal-electrode layer 13 extends beyond the shielding-electrode layer 15 and beyond the dielectric 14 and region 26 between interfaces 5 and 6 to interface or connect with the interface 6. Similarly, FIG. 6 shows the dielectric layer 12 overlaying the electrode layer 13, covering it and covering and extending beyond into region 25 separating electrode layer 13 from electrode layer 10 in a direction along a longitudinal axis of the component 3. A layer 16 of dielectric material encapsulates the electrode 15 and forms an end region 29 with dielectric layer 10.

Similarly, the shielding-electrode layer 11 covers and extends beyond the dielectric layer 12 and separating region 25 to interface with or contact the interface 7 provided on the component 3.

Figure 7:
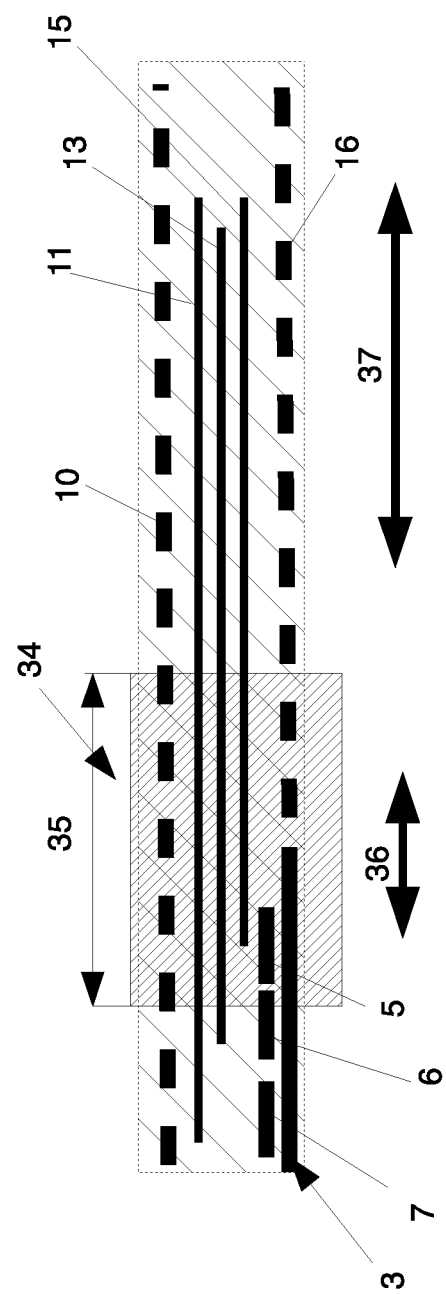
FIG. 7 shows a schematic side view of a sensor according to the same embodiment of the invention as FIGS. 1 to 6.

The signal electrode 13 and the respective conductive region 6 are overlaid by the shielding electrode 11. The shielding electrode 15 and conductive region 5 are also overlaid by the shielding electrode 11. The signal electrode 13 is shielded above and below, as shown in FIG. 7. The conductive region 6 is shielded either side as shown in FIG. 7 by conductive regions 5 and 7.

FIG. 6 shows region 27 where conductive layers or shielding electrodes, 11 and 15 extend beyond the conductive layer, or signal-electrode, 13. FIG. 6 illustrates that the signal electrode 13 is fully shielded over the stretch sensing component 2 and interface with interconnection component 3. This is illustrated with the signal electrode 13 having a shielding electrode 11 extending over and beyond signal electrode 13 and the respective interface 6 and having shielding electrode 15 underneath signal electrode 13 and also by having region 27 where shielding electrodes 11 and 15 extend beyond the signal electrode 13.

FIG. 7 shows a schematic side view of a stretch sensor component and illustrating a stretch control component 34. In this embodiment the stretch control component is operable to stretch under stress imparted by the sensor component 2 or by the stress which stretches the sensor component 2. This typically occurs as the sensor component is stretched by deformation of a body to which the sensor is mechanically coupled. The stretch control component of this embodiment is formed of an elastic material which extends over a juncture of the interconnection component 3 and the part of stretch sensor component 2 which stretches in use. The stretch control component 34 has a higher Young's modulus than the sensor component 2 so stretches less per unit length than the sensor component 2. The degree of stretch per unit length 36 occurring in the part of the sensor component 2 that is within the stretch control zone 35 is less than the degree of stretch per unit length 37 outside the stretch control zone. The stretch control component therefore graduates the degree of stretch between the interconnection component 3, which stretches little or not at all in this embodiment, and the sensor component 2.

Figure 8:
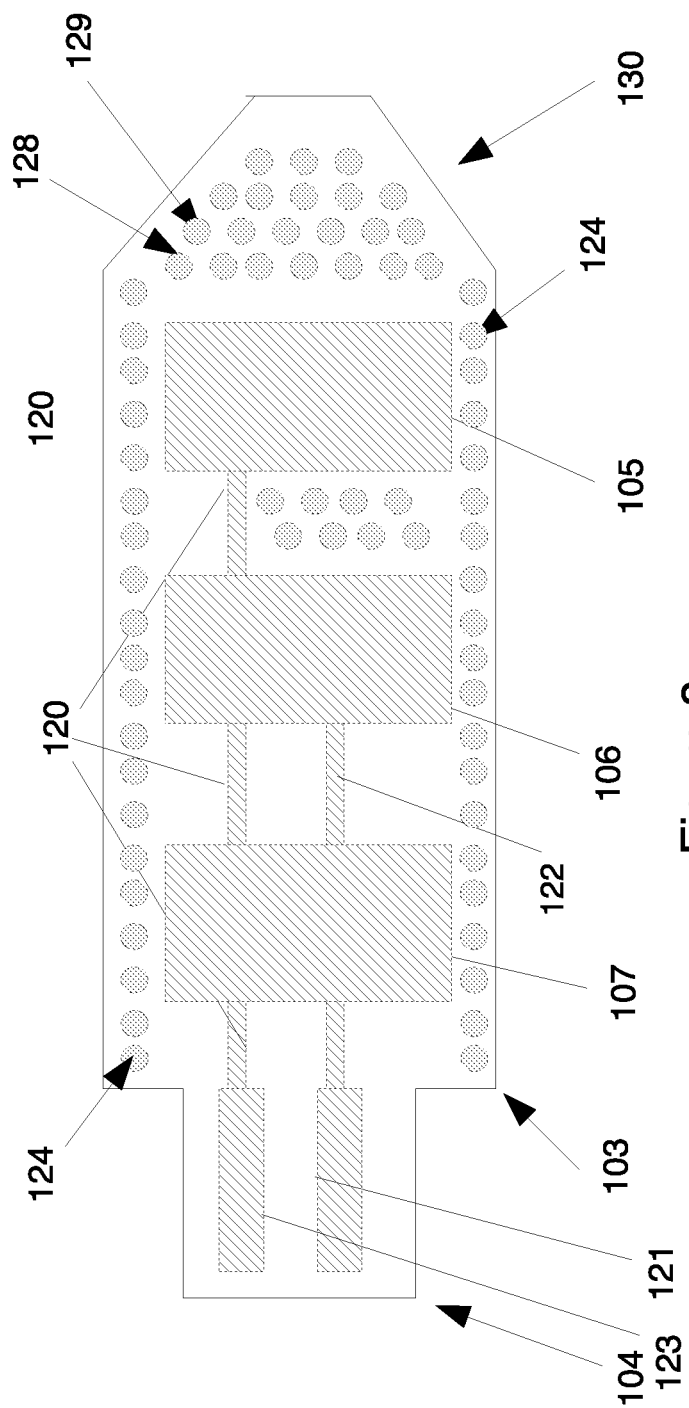
FIG. 8 shows an interconnection component according to an alternative embodiment of the invention to FIGS. 1 to 6.

FIG. 8 shows opposite sides of an interconnection component 103 according to an alternative embodiment of the invention to FIGS. 1 to 6. The interconnection component 103 is formed of a flexible circuit element 131 with a flexible substrate material 119 on which is formed conductive material to provide sensor interface regions 105 and 107 for shielding electrodes (not shown) of a stretch sensor component (not shown). A sensor interface region 106 is provided for a signal electrode (not shown). A track 120 is provided to connect interface regions 105 and 107 to the earthing or shielding terminal 123. A track 122 is provided to connect interface region 106 to signal terminal 121.

In the embodiment shown in FIG. 8 an end of the interconnection component 103 which is proximate the stretch sensor component (not shown) to the right of the page as shown in FIG. 8 has a tapered end 130. This taper causes the substrate material 119 and interconnection component 103 to be more flexible at the end approximate the sensor component (not shown). This acts to relieve stress and/or strain at a junction, as seen in plan view, of the interconnection component 103 and stretch sensor component (not shown). The tapered region may be recognised as a strain control section of the sensor.

Also in the embodiment shown in FIG. 8 rows 128 and 129 of apertures are formed in the end of the substrate 119 of the interconnection component 103. These also act to increase the flexibility of the interconnection component 103 at the juncture of the interconnection component 103 and the stretch sensor component (not shown). Rows 128 and 129 also act to graduate the degree of stretch occurring in the stretch sensor component (not shown) at the juncture of the interconnection component 103. The apertures 124 of adjacent rows are offset from each other as shown. Apertures 124 are also provided about the periphery of the interconnection component 103. Rows 132 and 133 are also provided in interior spaces of the interconnection component 103 between conductive material and relatively towards the end or the interconnection 103 approximate the stretch sensor component (not shown). These apertures 124 make the component 103 more flexible towards the juncture 2. The apertures 124 also reduce stress and/or strain of the stretchable material of the stretch sensor component (not shown), particularly at the junction (not shown).

Further and additional embodiments will now be described.

In some embodiments the interconnection component is elongate having a longitudinal axis or length. In some embodiments the conductive regions provided for electrodes of a sensor or soft electronic component are arranged spaced apart in the longitudinal direction.

In some embodiments the electrodes are arranged in a stack of layers in which each successive electrode extends further along the interconnection component in the longitudinal axis to overlay a respective conductive region. In some embodiments each previous electrode to a given electrode in the stack does not extend along the longitudinal length far enough to overlay a conductive region of the given electrode.

In some embodiments dielectric layers overlaying respective electrodes and separating electrode layers overlay the conductive region overlaid by the respective electrode.

Some embodiments have an electrode of the stretch sensor component in the form of an elongate rectangle with a tab defined in its layout to extend over an interface region, such as 7.

In some embodiments the dielectric layers are wider laterally than electrodes. This allows the sensor to be divided from an array of sensors which are manufactured in parallel.

In some embodiments an array of interconnection components is formed from a single printed circuit with individual interconnection components divided from the array.

In some embodiments an end part, such as exemplified by 29 in FIG. 6, provides a clamping region which is clamped in a device which stretches the sensor 1, and specifically the sensor component 2. In this embodiment the clamping region is clamped to stretch the sensor 1 to calibrate a change in capacitance or other electrical characteristic with degree of extension, stretch or other deformation. Some embodiments comprise calibration data.

In some embodiments of the invention the interfaces of conductive material, such as exemplified by 5, 6 and 7 of FIG. 1, maybe terminals for electrodes of a sense or component, such as exemplified by 2 of FIG. 1.

Embodiments of the present invention provide a sensor operable to provide an electrical characteristic that varies with a degree of stretch of a sensor component, the sensor component operable to stretch to change an area of overlap between first and second electrode films in the sensor and/or the separation of first and second electrode films, wherein the changes in capacitance between electrode films can be measured to measure stretch in the sensor component, first and second terminals operable to connect to a cable for connection to a circuit to allow measurement of the change in the capacitance across two or more electrode films; an interconnection component operable to mount the terminals and providing a surface comprising a first conductive region to which a first electrode film is bonded to electrically connect the film to a first terminal and comprising a second conductive region onto which a second conductive films is bonded to connect the second film to the second terminal.

In some embodiments the second electrode film may overlay the first electrode film and connect the first conductive region on the interconnection component so as to electrically shield the first electrode film and shield the first conductive region on the interconnection component.

In some embodiments the sensor may comprise a third electrode film which is overlaid by the second electrode film and bonded to a third conductive region, wherein the third electrode film is insulated by an insulating film which also insulates the second electrode film from the third conductive region.

In some embodiments the second electrode film may be covered by the first and third electrode films so as to electrically shield the second electrode.

In some embodiments the second electrode film may be separated from the first electrode film and the first conductive region by an insulating film.

In some embodiments the sensor may be arranged substantially as a sheet and the conductive regions may be parallel with respective bonded electrode films.

In some embodiments the allows bonding of the film to resist tension applied to the electrode films in use in the plane of the sensor component while allowing interconnection of thin fragile electrically conductive films by overlaying selected regions and/or by separating selected electrode films with insulating films.

In some embodiments defined regions of overlay of electrode films and insulating films over conductive regions allow selected interfacing of electrode films and conductive regions to arrange selected interconnection of electrode films to terminals for a cable of a sensing circuit.

In some embodiments bonding to regions arranged parallel provides a sensor with stretchable electrode films which are intrinsically fragile and which are required to stretch an approximately in-plane mechanical bond with a separate interconnection of electrode films with separate films overlaying and bonding to separate regions.

In some embodiments this provides bonding of stretchable thin fragile electrically conductive_films with regions on a surface to both mechanically attach and electrically interconnect separate films.

In some embodiments the interconnection component may be flexible.

In some embodiments the interconnection component may comprise a sheet of flexible material on which the conductive regions are provided.

In some embodiments the interconnection component may comprise one or more stretch control features which influence stretch fields occurring in the sensor component in a stretch control section.

In some embodiments the interconnection component may comprise one or more stretch control features which influence stretch fields occurring in a section of the sensor.

In some embodiments the stretch control features may comprise a taper formed in the profile of the interconnection component.

In some embodiments the stretch control features may comprise an aperture formed in the interconnection component.

In some embodiments the stretch control features may comprise material moulded over a juncture between the interconnection component and the sensor component.

Embodiments of the invention provide a sensor having an interconnect between a stretchable sensing component and terminals for a sensing circuit the interconnect comprising a flexible substrate having conductive material provided thereon, the interconnect being embedded into the stretchable sensor component with distinct conductive layers of the stretchable sensing component contacting distinct regions of conductive material which are connected to the terminals. The stretchable component may be an electroactive polymer sensor.

In some embodiments the interconnect may be formed of a flexible circuit board.

In some embodiments the interconnect may be formed of a flexible circuit board as part of an array of interconnection components.

In some embodiments the circuit board may be adapted to be more flexible at a region proximate to boundary between the circuit board and the stretchable sensing component.

In some embodiments selected layers of the stretchable sensor component may be bonded to selected interface regions of the interconnect.

In some embodiments selected layers of the stretchable sensor component may electrically insulated from selected interface regions of the interconnect.

In some embodiments the circuit board may comprise interface regions of conductive material to interface electrically with the stretchable sensor component wherein the regions are arranged in a set of regions progressively closer to a region of the sensor component which stretches in use and the stretchable sensor component may have conductive layers where each conductive layer interfaces electrically with different regions of conductive material on the circuit board.

Embodiments of the invention provide an interconnection component operable to interconnect a stretchable sensing component and a sensing circuit or a cable for a sensing circuit, the component comprising a flexible circuit board comprising conductive regions to electrically connect to conductive layers of the sensor. The flexible circuit board may comprise engagement features to allow the interconnection component to be embedded in and engage with the stretchable sensing component. The circuit board may be adapted to be more flexible at a region proximate to the boundary between the circuit board and stretchable sensing component.

In some embodiments the circuit board may have apertures formed therein to adapt the circuit board to be more flexible and to be engaged by the stretchable sensor component.

In some embodiments the interconnection component may comprise one or more projections formed in the periphery of the interconnection component to be engaged by the stretchable sensor component.

Embodiments of the invention provide a sensor having an interconnection between a stretchable sensing component and a sensing circuit or a cable for a sensing circuit comprising conductive layers of the stretchable sensor component interfacing with regions of conductive material on the interconnection component Embodiments of the invention provide an interconnection component for interconnecting a stretchable sensing component and a sensing circuit or a cable for a sensing circuit the interconnection component providing regions of conductive material to interface with layers of the stretchable sensing component.

In some embodiments the circuit may comprise a signal cable.

In some embodiments the circuit may comprise a shielded signal cable.

In some embodiments the interconnection component may comprise engagement features to allow the stretchable sensing component to engage the interconnection component.

In some embodiments the engagement features may comprise one or more apertures and/or recesses formed in the periphery of the interconnection component.

In some embodiments the interconnection component may comprise one or more projections formed in the periphery of the interconnection component.

In some embodiments the interconnection component may comprise one or more projections formed in the periphery of the interconnection component at an end.

In some embodiments the interconnection component may comprise one or more projections formed in the periphery of the interconnection component in a side.

In some embodiments the interconnection component may comprise flexibility features to provide flexibility for the interconnection component. The flexibility features may comprise apertures formed in the interconnection component. The flexibility features may comprise of one or more tapers formed in the interconnection component. The flexibility features may comprise one or more projections from the periphery of the interconnection component.

In some embodiments the apertures may be arranged according to a selected density of area substrate of the interconnection component to aperture area.

In some embodiments the density of area of substrate to area of apertures may be arranged to be less in a region of the interconnection component proximal to the stretchable sensor component compared to a region distal from the stretchable sensor component in use.

In some embodiments the one or more projections may comprise one or more fingers extending from the periphery of the circuit board into stretchable sensing component.

In some embodiments the one or more projections may comprise a taper in the periphery of the interconnection component or projection from the interconnection component tapering in the direction of the stretchable sense component in use.

Another embodiment of the invention provides a sensor with improved interconnect between a stretchable sensor and a sensing circuit, wherein the stretchable sensor is operable to stretch and change an electrical characteristic, the sensor comprising:

an interconnection component having first and second conductive interfaces formed of conductive regions of conducting material, the conductive interfaces connected to first and second terminals for the sensing circuit;

a first conductive layer of stretchable conductive material for the sensor, the first conductive layer comprising a first sensor region operable to stretch, the first conductive layer also comprising a first interface region overlaying the first conductive interface of the flexible component to connect first conductive layer to the first terminal;

a second conductive layer of stretchable material comprising a second sensor region operable to stretch and comprising a second interface region overlaying a second conductive interface region of the flexible component to connect the second conductive layer to the second terminal;

a first dielectric layer of stretchable dielectric comprising a sensor region operable to provide electrical insulation for the first conductive layer of stretchable material from the second conductive layer of stretchable material and an interface region which overlays the first conductive interface region of the interconnection component to provide insulation between the second conductive layer of stretchable material and the first conductive interface of the interconnection component.

Alternatively, an interconnection component having first and second and third conductive interfaces formed by conductive regions of conducting material, the first conductive interface connected to a first terminal, the second conductive interface connected to a second terminal, and the third conductive interface connected to either the first terminal, the second terminal, or a third terminal.

The conductive interfaces may be formed of conductive regions of conducting material on the interconnection component may be in the same plane.

The conductive interfaces may be formed of conductive regions of conducting material on the interconnection component may be stacked on top of each other, with a portion of each conductive interface being exposed to enable a connection to be made to said conductive interface.

Optionally, a third conductive layer of stretchable material comprising a third sensor region operable to stretch and comprising a third interface region overlaying a third conductive interface region of the flexible component to connect the third conductive layer to one of the first or second or third terminals.

Where a third conductive layer of stretchable material is present, a second dielectric layer of stretchable dielectric material bonded to the first conductive layer the second dielectric layer comprising a sensor region operable to provide electrical insulation for the second conductive layer of stretchable material from the third conductive layer of stretchable material and comprising an interface region which overlays the second conductive interface region of the conductive component to provide insulation between the third conductive layer of stretchable material and the second conductive interface of the conductive component.

In some embodiments the interface region of the second conductive layer of the stretchable sensor may overlay a portion of the first conductive layer and an interface region of the third conductive layer may overlay the entire second conductive layer such that the second conductive layer may provide a signal conductor for the sensor which is shielded by the first and third conductive layers wherein a capacitance between the signal conductor and the shielding layers varies as the layers are stretched.

In some embodiments the third conductive layer may overlay but not contact the second interface region of the interconnection component to electrically shield the second conductive interface of the flexible component.

In some embodiments the interconnection component may have an additional electrically conductive layer that overlays the second interface region of the interconnection component on the opposite surface of the interconnection component to the surface on which the second interface region of the interconnection component and the second conductive layer of the stretchable sensor component interface, but that does not contact the second interface region of the interconnection component or the second conductive layer of the stretch sensor component and that can be used to further electrically shield the second conductive interface of the flexible component.

In some embodiments the additional electrically conductive layer of the interconnection component may be a solid layer of conductive material.

In some embodiments the additional electrically conductive layer of the interconnection component may comprise partially or fully of a cross-hatched or otherwise patterned layer of conductive material to reduce the amount of conductive material required, improve flexibility, or both.

In some embodiments the interconnection component may comprise first and second terminal regions formed of conductive material to provide connection to a sensing circuit or a cable for a sensing circuit to allow the sensor to be connected to a sensing circuit.

In some embodiments the terminal regions may extend in a direction parallel to the sensor region such that a cable connected to the interconnection component would extend from the interconnection component in-line with the sensor region.

In some embodiments the terminal regions may extend in at an arbitrary angle to the sensor region such that a cable or circuit connected to the interconnection component would extend from the interconnection component in-line with the terminal regions.

In some embodiments the regions of conductive material on or in the interconnection component may comprise metal bonded to a flexible substrate wherein the regions have been formed by removing metal from regions of the substrate not intended to be conductive.

In some embodiments the regions of conductive material may comprise one or more sensor-interconnection regions to provide a region of connection between the sensor and the conductive component.

In some embodiments the regions of conductive material may comprise one or more cable-interconnection regions to provide a region of connection between a cable to an instrumenting circuit and the flexible conductive component.

In some embodiments the conductive component may comprise two or more tracks of conductive material to connect the sensor interface regions to cable interface regions.

In some embodiments the regions of conductive material may be formed as two or more layers on or in the flexible substrate.

In some embodiments the regions of conductive material may be formed by removing a negative of regions of conductive material performed by chemical etching.

In some embodiments the regions of conductive material may be defined by lithography.

The interconnection component may be a flexible flat circuit.

In some embodiments the interconnection component may comprise a flexible circuit element.

In some embodiments the interconnection component may be formed by cutting the component from an array of interconnection components formed from a single sheet of substrate.

In some embodiments the interconnection component may be formed by cutting the component from an array of interconnection components formed from a single sheet of flexible printed circuit board.

In some embodiments the interconnection component may be formed in an array of interconnection components that are only separated after they have been embedded into a stretchable sensor component.

In some embodiments the interconnection component may be formed in an array of interconnection components that remain connected after they have been embedded into a stretchable sensor component.

In some embodiments the interconnection component may have formed therein apertures so as to impart flexibility into the interconnection component.

In some embodiments the interconnection component may have formed therein apertures so as to allow adhesive used to bond one or more of the layers of the sensor to assume a complimentary shape to mechanically engage with the interconnection component.

In some embodiments the apertures formed in the interconnection component may have a selected density in one or more regions of the interconnection component. This may allow selection of the density of area substrate material of the interconnection component to area of aperture.

In some embodiments the apertures formed so as to vary density according to the proximity to the periphery of the interconnection component.

In some embodiments the sensor regions of the conductive layers may be elongate.

In some embodiments the sensor regions of conductive layers may be elongated extending away from the interconnection component.

In some embodiments the direction in which density is varied may be towards the sensor region of the conductive layers.

In some embodiments the interconnection component may have a profile which defines one or more projections extending in a direction towards the sensor region.

In some embodiments the interconnection component may have a profile which defines one or more projections extending into the sensor region.

In some embodiments the apertures may comprise rows extending transverse to a direction towards the sensor region wherein rows comprise sets of apertures offset from the sets of apertures of the adjacent row.

In some embodiments the stretchable material may be elastic so as to be stretchable while maintaining its volume.

Stretchable material may be elastic so as to be stretchable but substantially not compressible in use.

In some embodiments the sensor may or may not be operable to be affixed to a garment.

Embodiments of the invention comprise a sensor having features as defined by steps in any one of the process described above.

Embodiments of the invention provide an interconnection component for a stretchable sensor, the sensor operable to stretch and to vary its electrical properties as it stretches to allow instrumentation of a body to which it is mechanically coupled, the interconnection component comprising an interconnection component formed as a flexible printed component.

Aspects of the invention provide a sensor with an improved interconnect between a stretchable sensor and a sensing circuit, wherein the sensor is operable to be mechanically coupled to a body which deforms, operable to stretch as the body is deformed and operable to change an electrical characteristic to instrument deformation of the body, the sensor comprising:

an interconnection component having first and second conductive interface regions formed of conducting material, and optionally a third conductive interface region of conducting material;

a first conductive layer of stretchable conductive material for the sensor the first conductive layer comprising a first sensor region operable to stretch and comprising a first interface region overlaying a first interface conductive region of the flexible component to connect the sensor region of the conductive layer of stretchable material to the flexible conductive component;

a second conductive layer of stretchable material comprising a second sensor region overlaying the first sensor region and operable to stretch and comprising a second interface region overlaying a second conductive interface region of the flexible component;

a first dielectric layer of stretchable dielectric material bonded to the first conductive layer the first dielectric layer comprising a sensor region operable to provide electrical insulation for the first conductive layer of stretchable material from the second conductive layer of stretchable material and an interface region which overlays the first conductive interface region of the conductive component to provide insulation between the second conductive layer of stretchable material and the first conductive interface of the conductive component;

Optionally, the sensor comprises a third conductive layer of stretchable conductive material for the sensor the third conductive layer comprising a third sensor region operable to stretch and comprising a third interface region overlaying a third interface conductive region of the interconnection component to connect the sensor region of the conductive layer of stretchable material to the flexible conductive component.

If the third conductive layer of stretchable conductive material for the sensor is present, a second dielectric layer of stretchable dielectric material bonded to the second conductive layer the second dielectric layer comprising a sensor region operable to provide electrical insulation for the second conductive layer of stretchable material from the third conductive layer of stretchable material and an interface region which overlays the second conductive interface region of the conductive component to provide insulation between the third conductive layer of stretchable material and the second conductive interface of the conductive component;

In some embodiments the interconnection component may have an additional electrically conductive layer that overlays the second interface region of the interconnection component on the opposite surface of the interconnection component to the surface on which the second interface region of the interconnection component and the second conductive layer of the stretchable sensor component interface, but that does not contact the second interface region of the interconnection component or the second conductive layer of the stretch sensor component and that can be connected to first conductive interface region and/or the third conductive interface region of the interconnection component to further electrically shield the second conductive interface of the flexible component.

In some embodiments the sensor may further comprise a strain control component comprising stretchable material extending over a strain control section of the sensor, the stretch control section including a juncture in the plan of the interconnection component and sensor component. The strain control component may be arranged to stretch in response to stress applied by the sensor component stretching and to reduce the degree of stretch in the sensor component in the stretch control section.

In some embodiments the second conductive layer may overlay a portion of the first conductive layer and the third conductive layer may overlay the entire second conductive layer so that the second conductive layer provides a signal conductor for the sensor which is shielded by the first and third conductive layers wherein a capacitance between the signal conductor and the shielding layers varies as the layers are stretched.

Embodiments of the invention comprise a sensor having rigid terminals for connection to sensing electronics, a stretchable soft electronic component operable to deform and provide a changing electrical characteristic with stretch and an interconnect between the terminals and the soft electronic component which is flexible but resistant to stretching.

Embodiments of the invention comprise a sensor having rigid terminals for connection to sensing electronics, a stretchable soft electronic component operable to deform and provide a changing electrical characteristic with stretch, the soft electronic component having one or more electrodes and an interconnect between the terminals and the electrode(s), wherein the soft electronic component is flexible but resistant to stretching. The interconnect may be non-stretchable.

In some embodiments the interconnection component is formed of a flexible printed circuit board.

In some embodiments an end of the interconnection component is able to flex under stress imparted by the sensor component.

In some embodiments a sensor component is formed as a series of films of material.

In some embodiments the series of films are screen printed to overlay the interconnection component in a layout defined by screens.

Some embodiments of the present invention comprise a sensor component which has thin dielectric layers formed of elastic material and thin conductive layers also formed of dielectric material.

In various embodiments the region of conductive material providing interfaces on the interconnection component is formed by chemical etching of a layer of conductive material using lithography to chemically alter a chemical masking material.

Various embodiments have overlapping electrodes which provide a capacitance which varies when the layers are stretched and/or compressed.

Various embodiments have overlapping electrodes which become closer to vary capacitance provide as the layers are stretched and/or compressed.

Various embodiments have overlapping electrodes which have a greater area of overlap as the layers are stretched and/or compressed.

Various embodiments have overlapping electrodes which provide a capacitance which varies when the layers are stretched and/or compressed in a range which is selected for given sensing and/or measuring circuits.

Some embodiments of the invention comprise conductive elastic films formed of elastic material which is impregnated or doped with graphite or carbon.

Embodiments of the present invention are adapted to sense or measure compression by changes in capacitance through deformation of the sensor as understood by the reader.

Various embodiments of the present invention comprise conductive elastic layers formed of elastic material which is impregnated or doped with any suitable material or compound known to the reader to cause the material to act as a conductor and/or act as an electrode of a capacitor.

Some embodiments have a soft electronic component which is a known alternative to a capacitor. Various alternatives may include a circuit, a resistor, or a network of soft components.

Some embodiments have a soft electronic component which is a known alternative to a sensor. Various alternatives may include a circuit, a resistor, or a network of soft components.

In some embodiments a soft electronic component is formed of films of elastomeric material. In some embodiments the component comprises elastomeric material to provide dielectric layers or patterns and elastomeric material with dispersed material to provide conductive layers or patterns. In some embodiments the material of both dielectrics and conductors is silicone.

Various embodiments provide a sensor or soft electronic component which provides an electrical characteristic which varies with deformation.

In some embodiments the electrical characteristic is capacitance. In various embodiments an electrical characteristic is capacitance.

In some of these embodiments the capacitances are the range of hundreds of Picofarads.

In various embodiments an electrical characteristic to be used is inductance.

In various embodiments an electrical characteristic to be used is inductance.

In various embodiments an electrical characteristic to be used is a circuit characteristic involving two or more of the of electrical characteristics above.

In various embodiments the electrical characteristic is a characteristic which is referenced to earth or to a shielding electrode. For example, capacitance of a signal electrode which stretches may be the capacitance between the signal electrode and one or more shielding electrodes and may be a result of deformation in both the shielding electrode and the signal electrode as well as, in some cases, dielectric layers separating these.

In some embodiments variation in electrical characteristic is used for sensing deformation or changes in deformation.

In some embodiments variation in electrical characteristic is used for generating power. In some embodiments power is generated by holding a priming charge while the electrical characteristic changes.

In some embodiments soft electronic components are used to generate mechanical force.

In some embodiments material used to provide a soft electronic component such as a sensor is a matrix material.

In some embodiments the material used to provide a soft electronic component such as a sensor is an elastic material.

In some embodiments material used to provide a soft electronic component such as a sensor is a silicone-based material.

In some embodiments electrodes are formed using a matrix similar to that of dielectric layers adapted with a dispersant, doping agent or other means known to the reader.

In some embodiments the electrodes are conductive due to conductive materials, such as particles, being added to a material.

In some embodiments the material of the electrodes and the material of dielectric layers have a similar stretch and/or compliance and/or elastic properties.

In some embodiments the electrical device is formed of films of materials.

In some embodiments layers or films of materials are formed of material which is initially liquid and then set or cured.

Some embodiments are formed in a process with a step of casting to manufacture a layer of a sensor. The casting step of some embodiments uses a cast into which a material to be deposited is applied. In some embodiments the casting step is used to apply a layer of conductive material in a defined pattern. The casing may use casts as pattern components, which define patterns. The resulting product of some embodiments has a layer of the sensor defined by a cast. Some embodiments have a cast layer.

Some embodiments are formed in a process with a step of patterning sheet in the form of a stencil to deposit a layer of an integrated sensor and/or a pattern of signal electrodes and cable conductors. The stencilling of some embodiments uses stencils as pattern components, which define patterns for layers and/or a pattern of sensors. Some embodiments have a resulting product with a stencilled layer.

Some embodiments are formed in a process with a step of patterning sheet in the form of a screen to deposit by screen printing a layer of an integrated sensor and/or a pattern of signal electrodes and cable conductors. The printing of some embodiments uses screens as pattern components, which define patterns for layers and/or a pattern of sensors. Some embodiments have a resulting product with a screen-printed layer.

Some embodiments are formed in a process with a step of digital printing to deposit a layer of an integrated sensor and/or a pattern of signal electrodes and cable conductors. The printing of some embodiments uses computer controlled dispensing heads as pattern components, which define patterns for layers and/or a pattern of sensors. Some embodiments have a resulting product with a digitally printed layer.

Some embodiments are formed in a process with a step of flexography printing to deposit a layer of a sensor and/or a pattern of signal electrodes and cable conductors. The printing of some embodiments uses raised surfaces on planar or rotary tools as pattern components, which define patterns for layers and/or a pattern of sensors. Some embodiments have a resulting product with a flexographic layer.

Some embodiments are formed in a process with a step of gravure to deposit a layer of a sensor and/or a pattern of signal electrodes and cable conductors. The printing of some embodiments uses embossed patterns on rotary tools as pattern components, which define patterns for layers and/or a pattern of sensors. Some embodiments have a resulting product with a gravure layer.

Some embodiments are formed in a process with a step of offset lithography to deposit a layer of an integrated sensor and/or a pattern of signal electrodes and cable conductors. The printing of some embodiments uses a series of rollers to transfer liquids to a substrate in patterns defined to describe a pattern of layers and/or a pattern of sensors. Some embodiments have a resulting product with an offset lithography layer.

Some embodiments are formed in a process with a step of lamination to deposit a prefabricated layer of an integrated sensor and/or a pattern of signal electrodes and cable conductors. The lamination of some embodiments uses prefabricated patterned layers, which define patterns for layers and/or a pattern of sensors and/or cables. Some embodiments have a resulting product with a laminated layer.

Some embodiments are formed in a process with a step of spray deposition, implantation or injection of materials.

Some embodiments are formed in a process with a step of digital printing such as inkjet printing.

Some embodiments have a circuit or processor which determines an electrical characteristic, such as capacitance to give one example, for a signal electrode and/or a change in an electrical characteristic determined for the signal electrode. The determination dependent on in some embodiments is a deduction. In some embodiments the deduction or other determination is determined dependent on an electrical characteristic and/or change in electrical characteristic for a signal electrode associated with the cable conductor. In some embodiments the signal electrode may be associated geometrically with the cable conductor. In some embodiments the cable conductor may run alongside a signal electrode or sequence of signal electrodes so that the deformation, such as stretching or compression, occurring in the cable can be determined from the deformation occurring in the signal electrode. The reader will appreciate that deformation will involve deformation in signal electrodes and shielding electrodes and/or dielectric layers.

Some embodiments have a circuit or processor which is operable to read data carrying information on deformation characteristics of a sensor or soft electronic circuit.

Some embodiments have a circuit or processor which is operable to read data carrying calibration information for a sensor or soft electronic circuit.

Some embodiments have a circuit or processor which is operable to read stored data and compute deformation parameters, metrics or data dependent on electrical characteristics.

In some embodiments the sensor component is adapted to provide an electrical characteristic which changes with types of deformation that complement or are alternatives to stretching. These deformations may comprise compression or uneven distortion of the sensor component.

In various embodiments a change in capacitance is determined by a capacitance measurement and a computation dependent on the capacitance measured and dependent on data characterising a length, geometry or configuration of a given sensor or type of sensor at rest.

In some embodiments terminals are adapted for connection to a cable for an electrical circuit, the cable comprising a wire. In some embodiments the terminal comprises a connector for the cable. In some embodiments the terminal is operable to support the cable. In other embodiments the terminal is adapted for connection directly to an electrical circuit. In other embodiments the terminal is adapted for connection to a circuit board.

In various embodiments there are various numbers of terminals.

In various embodiments the electrodes of the sensor component are interconnected in various different ways to the terminals present.

In various embodiments there are various numbers of electrodes in the sensor component.

In various embodiments the sensor may have a number of sensor components.

In alternative embodiments the track connecting given conductive regions to given terminals provide alternate interconnections of electrode to terminal.

Embodiments of the present invention provide a sensor with an interconnector which allows electrodes of a sensor component to be interconnected to terminals for a circuit, such as a sensing circuit, via interfaces which can be adapted for bonding with stretchable films, such as by adapted width or length of conductive regions providing the interfaces.

Embodiments of the present invention allow shielding of electrodes to be provided even in sensor devices which are adapted for bonding and/or robustness against failure under stretching of a sensor component and adapted for interconnection of conductive films to terminals, such as by the shape and/or width and/or length of the conductive regions providing interfaces for interconnecting the electrode films.

As used herein the word "comprise", "having" or equivalent variations thereof is used in an inclusive sense to specify the presence of the stated feature or features. This term does not preclude the presence or addition of further features in various embodiments.

As used herein the words "first", "second", and "third" or equivalent variations thereof is used in an inclusive sense to specify the presence of the stated feature or features and is not limited to an order. This term does not preclude the presence or addition of further features in various embodiments.

As used herein the word "a" or equivalent variations thereof is used in an inclusive sense to specify the presence of the stated feature or features. This term does not preclude the presence or addition of further features in various embodiments.

As used herein the term "strain control" and equivalent variations is used broadly to include influencing strain, limiting strain or having some influence on strain.

As used herein the term "overlay" is intended to refer broadly to include instances where there is contact between respective layers or and overlaid layers or regions and instances where the layers or regions are separated.

As used herein the term "component" is intended to refer broadly to include components integrated with other components and not limited to separable components.

As used herein the term "body" is intended to refer to an object which may include a part of a human or animal body or an inanimate body such as a body of a machine, structure or natural object.

As used herein the term "substrate' is intended to refer broadly to material to which conductive material may be bonded and is intended to include material to which conductive material can be bonded on either side or even either side and within the substrate.

The reader will be aware of various materials that are suitable for use as conductive material on a circuit board or other form of interconnection and various embodiments of this invention use various alternatives of materials known to the reader as suitable for given applications.

The reader will be aware of various materials that are suitable for use as substrate material on a circuit board or other form of interconnection component and various embodiments of this invention use various alternatives of materials known to the reader as suitable for given applications.

It is to be understood that the present invention is not limited to the embodiments described herein and further and additional embodiments within the spirit and scope of the invention will be apparent to the skilled reader from the examples illustrated with reference to the drawings. In particular, the invention may reside in any combination of features described herein, or may reside in alternative embodiments or combinations of these features with known equivalents to given features. Modifications and variations of the example embodiments of the invention discussed above will be apparent to those skilled in the art and may be made without departure of the scope of the invention as defined in the appended claims.

What is claimed is:

1. A sensor operable to provide a capacitance which varies with stretch, the sensor comprising:
   a sensor component comprising first and second electrode films separated by a dielectric film to provide a capacitance, wherein the sensor component is operable to stretch to change an area of overlap of the electrode films and/or change the separation of the electrode films to change the capacitance, wherein the capacitance is measurable to allow stretch in the sensor component to be measured;
   first and second terminals operable to connect to a circuit to allow measurement of the capacitance;
   an interconnection component comprising a first conductive region to which the first electrode film is bonded to electrically connect the first electrode film to the first terminal and comprising a second conductive region onto which the second conductive film is bonded to connect the second electrode film to the second terminal, wherein the second electrode film overlays the first electrode film and first conductive region on the interconnection component to shield the first electrode film.

2. The sensor of claim 1 comprising a third electrode film and third conductive region to which the third electrode is bonded, wherein the third electrode film and third conductive region are overlaid by the second electrode.

3. The sensor of claim 2 wherein the first electrode film is located between the second and third electrode films.

4. The sensor of claim 1 wherein the sensor component is arranged substantially as a sheet and the conductive regions are arranged parallel to respective bonded electrode films.

5. The sensor of claim 1 wherein the interconnection component comprises a sheet of flexible material on which the conductive regions are provided.

6. The sensor of claim 1 wherein the interconnection component comprises one or more stretch control features which influence fields of stretch occurring in the sensor component in a stretch control section of the sensor.

7. The sensor of claim 6 wherein the stretch control feature(s) comprises a taper formed in the interconnection component.

8. The sensor of claim 6 wherein the stretch control feature(s) comprises one or more apertures formed in the interconnection component.

9. The sensor of claim 6 wherein the stretch control feature(s) is arranged to graduate strain occurring in the strain control section of the sensor component as the sensor is stretched.

10. The sensor of claim 6 wherein the strain control feature(s) provides an interface between the interconnection component and the sensor component wherein the interface has a range of angles to a direction of stretch.

11. The sensor of claim 6 wherein the stretch control features(s) comprise material moulded over a juncture between the interconnection component and the sensor component.

12. The sensor of claim 1 wherein the interconnection component comprises a stretch control section operable to stretch under stress imparted by the sensor component.

13. The sensor of claim 1 wherein the interconnection component comprises a stretch control section operable to flex under stress imparted by the sensor component.

14. The sensor of claim 1 wherein the terminals are rigid, the interconnection component is flexible but non-stretchable and the sensor component is stretchable.

15. A sensor with an interconnect between a stretchable sensor and a sensing circuit, wherein the sensor is operable to be mechanically coupled to a body which deforms, operable to stretch as the body is deformed and operable to change an electrical characteristic to instrument deformation of the body, the sensor comprising:
an interconnection component having first and second conductive interface regions formed of conducting material;
a first conductive layer of stretchable conductive material for the sensor the first conductive layer comprising a first sensor region operable to stretch and comprising a first interface region overlaying a first interface conductive region of the flexible component to connect the sensor region of the conductive layer of stretchable material to the flexible conductive component;
a second conductive layer of stretchable material comprising a second sensor region overlaying the first sensor region and operable to stretch and comprising a second interface region overlaying a second conductive interface region of the flexible component;
a first dielectric layer of stretchable dielectric material bonded to the first conductive layer the first dielectric layer comprising a sensor region operable to provide electrical insulation for the first conductive layer of stretchable material from the second conductive layer of stretchable material and an interface region which overlays the first conductive interface region of the conductive component to provide insulation between the second conductive layer of stretchable material and the first conductive interface of the conductive component; and
a third conductive layer of stretchable material overlaying a third interface region of the flexible component,
wherein the second conductive layer overlays a portion of the first conductive layer and the third conductive layer overlays the entire second conductive layer so that the second conductive layer provides a signal conductor for the sensor which is shielded by the first and third conductive layers wherein a capacitance between the signal conductor and the shielding layers varies as the layers are stretched,
wherein the second conductive layer overlays a portion of the first conductive layer and the third conductive layer overlays the entire second conductive layer so that the second conductive layer provides a signal conductor for the sensor which is shielded by the first and third conductive layers wherein a capacitance between the signal conductor and the shielding layers varies as the layers are stretched.

16. An interconnection component for a sensor which is operable to provide a capacitance which varies with a degree of stretch of a sensor component, the sensor component operable to stretch to change an area of overlap between first, second and electrode films in the sensor and/or change a separation of first and second electrode films, wherein changes in capacitance between electrode films are measurable to allow stretch in the sensor component to be measured, the interconnection component comprising:
first, second and third terminals operable to connect to a cable for connection to a circuit to allow measurement of a change in the capacitance across two or more of the electrode films,
wherein the interconnection component comprises a first conductive region for a first electrode film to be bonded to electrically connect the first electrode film to the first terminal, comprising a second conductive region for a second conductive film to be bonded to connect the second electrode film to the second terminal and comprising a third conductive region for a third electrode film to be bonded to connect the third electrode film to the third terminal, wherein the conductive regions are arranged such that the bonded second electrode film overlays the first electrode film and first conductive region on the interconnection component and such that the bonded third electrode film overlays the bonded second electrode film and the second conductive region wherein the bonded second electrode film is shielded by the first and third electrode films.

* * * * *